United States Patent
Zeng et al.

(10) Patent No.: US 12,461,817 B2
(45) Date of Patent: Nov. 4, 2025

(54) MEMORY MANAGEMENT METHOD, MEMORY STORAGE APPARATUS AND MEMORY CONTROL CIRCUIT UNIT

(71) Applicant: PHISON ELECTRONICS CORP., Miaoli (TW)

(72) Inventors: Shih-Jia Zeng, Hsinchu (TW); Chen Yang Tang, Taoyuan (TW); Chen-An Hsu, New Taipei (TW); Chih-Wei Wang, Tainan (TW); Wei Lin, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 18/625,174

(22) Filed: Apr. 2, 2024

(65) Prior Publication Data
US 2025/0291673 A1  Sep. 18, 2025

(30) Foreign Application Priority Data
Mar. 13, 2024  (TW) ................. 113109310

(51) Int. Cl.
*G06F 11/10* (2006.01)

(52) U.S. Cl.
CPC ........ *G06F 11/1068* (2013.01); *G06F 11/106* (2013.01)

(58) Field of Classification Search
CPC ............................ G06F 11/1068; G06F 11/106
See application file for complete search history.

(56) References Cited

U.S. PATENT DOCUMENTS

2017/0277448 A1* 9/2017 Khoueir ................. G06F 3/0616
2024/0062834 A1* 2/2024 Chang ................. G11C 16/0483

FOREIGN PATENT DOCUMENTS

TW  I661427  6/2019
TW  I751620  1/2022

OTHER PUBLICATIONS

"Office Action of Taiwan Counterpart Application", issued on Mar. 12, 2025, p. 1-p. 8.

* cited by examiner

*Primary Examiner* — Thien Nguyen
(74) *Attorney, Agent, or Firm* — JCIPRNET

(57) ABSTRACT

The present disclosure provides a memory management method, a memory storage apparatus and a memory control circuit unit. The method includes: performing a first operation on a plurality of physical units to obtain a quality estimation parameter corresponding to the physical units; establishing a check list according to the quality estimation parameter, wherein the check list records index information of a first physical unit among the physical units, and a number of the first physical unit is less than a total number of the physical units; and in response to a default condition being satisfied, performing a status scanning on the first physical unit according to the index information in the check list.

30 Claims, 6 Drawing Sheets

MEMORY MANAGEMENT METHOD, MEMORY STORAGE APPARATUS AND MEMORY CONTROL CIRCUIT UNIT

CROSS-REFERENCE TO RELATED APPLICATION

This application claims the priority benefit of Taiwan application serial no. 113109310, filed on Mar. 13, 2024. The entirety of the above-mentioned patent application is hereby incorporated by reference herein and made a part of this specification.

BACKGROUND

Technical Field

The present disclosure relates to a memory management method, a memory storage apparatus and a memory control circuit unit.

Description of Related Art

Portable electronic devices such as mobile phones and notebook computers have been developed rapidly in recent years, resulting in a rapid increase in consumer demand for storage media. Since rewriteable non-volatile memory modules (such as flash memory) are characterized in non-volatile data, power saving, small size, and no mechanical structure, they are very suitable to be built into various portable electronic devices as exemplified above.

Generally speaking, the memory controller will perform full-disc scanning on the rewritable non-volatile memory module in an idle state every preset period (such as a few days or months) to confirm the overall health degree of the rewritable non-volatile memory module. For example, in the full-disc scanning, the data storage status of each physical unit in the rewritable non-volatile memory module may be checked. Once a physical unit in an abnormal state (for example, the bit error rate is too high) is detected, the memory controller may perform maintenance actions such as data refresh or data backup on the physical unit.

In practice, the execution frequency of full-disc scanning may be increased by shortening the above-mentioned preset period (that is, shortening the time interval between two consecutive full-disc scanning executions), thereby effectively ensuring the overall health of the rewritable non-volatile memory module being always in compliance with the specification. However, as the capacity of the rewritable non-volatile memory module continues to increase, the time required to perform full-disc scanning on the rewritable non-volatile memory module will also increase accordingly. Therefore, if full-disc scanning is performed too frequently, system resources may easily be wasted, and the lifetime of the rewritable non-volatile memory module may even be shortened. In addition, if the execution frequency of full-disc scanning is too low, the optimal time point for data maintenance on some physical units may be missed, resulting in subsequent data read and write problems. Therefore, how to effectively improve the maintenance efficiency of rewritable non-volatile memory modules is actually one of the research topics that technicians in related technical fields are devoted to.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The present disclosure provides a memory management method, a memory storage apparatus and a memory control circuit unit, which may improve.

The present disclosure provides a memory management method, which is adaptable for a rewritable non-volatile memory module, wherein the rewritable non-volatile memory module comprises a plurality of physical units, and the memory management method comprising: performing a first operation on the physical units to obtain a quality estimation parameter corresponding to the physical units; establishing a check list according to the quality estimation parameter, wherein the check list records index information of a first physical unit among the physical units, and a number of the first physical unit is less than a total number of the physical units; and in response to a default condition being satisfied, performing a status scanning on the first physical unit according to the index information in the check list.

The present disclosure further provides a memory storage apparatus, comprising a connection interface unit coupled to a host system, a rewritable non-volatile memory module comprising a plurality of physical units and a memory control circuit unit coupled to the connection interface unit and the rewritable non-volatile memory module, wherein the memory control circuit unit is configured to: perform a first operation on the physical units to obtain a quality estimation parameter corresponding to the physical units; establish a check list according to the quality estimation parameter, wherein the check list records index information of a first physical unit among the physical units, and a number of the first physical unit is less than a total number of the physical units; and in response to a default condition being satisfied, perform a status scanning on the first physical unit according to the index information in the check list.

The present disclosure further provides a memory control circuit unit for controlling a rewritable non-volatile memory module, wherein the rewritable non-volatile memory module comprises a plurality of physical units, and the memory control circuit unit comprises a host interface configured to be coupled to a host system, a memory interface configured to be coupled to the rewritable non-volatile memory module and a memory management circuit coupled to the host interface and the memory interface, wherein the memory management circuit is configured to: perform a first operation on the physical units to obtain a quality estimation parameter corresponding to the physical units; establish a check list according to the quality estimation parameter, wherein the check list records index information of a first physical unit among the physical units, and a number of the first physical unit is less than a total number of the physical units; and in response to a default condition being satisfied, perform a status scanning on the first physical unit according to the index information in the check list.

Based on the above, after the quality estimation parameters corresponding to the physical units in the rewritable non-volatile memory module are obtained, the check list may be established according to the quality estimation parameters. In particular, the check list records index information of a part of physical units in the rewritable non-volatile memory module (not all of the physical units in the rewritable non-volatile memory module). Then, in response to a default condition being satisfied, the status scanning may be performed, according to the index information in the check list, on a part of physical units in the rewritable non-volatile memory module (not all of the physical units in the rewritable non-volatile memory module). Therefore, the management and efficiency problems due to the frequency of the full-disc scanning being too high or too low may be improved, and the maintenance efficiency for the rewritable non-volatile memory module may also be improved.

To make the aforementioned more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
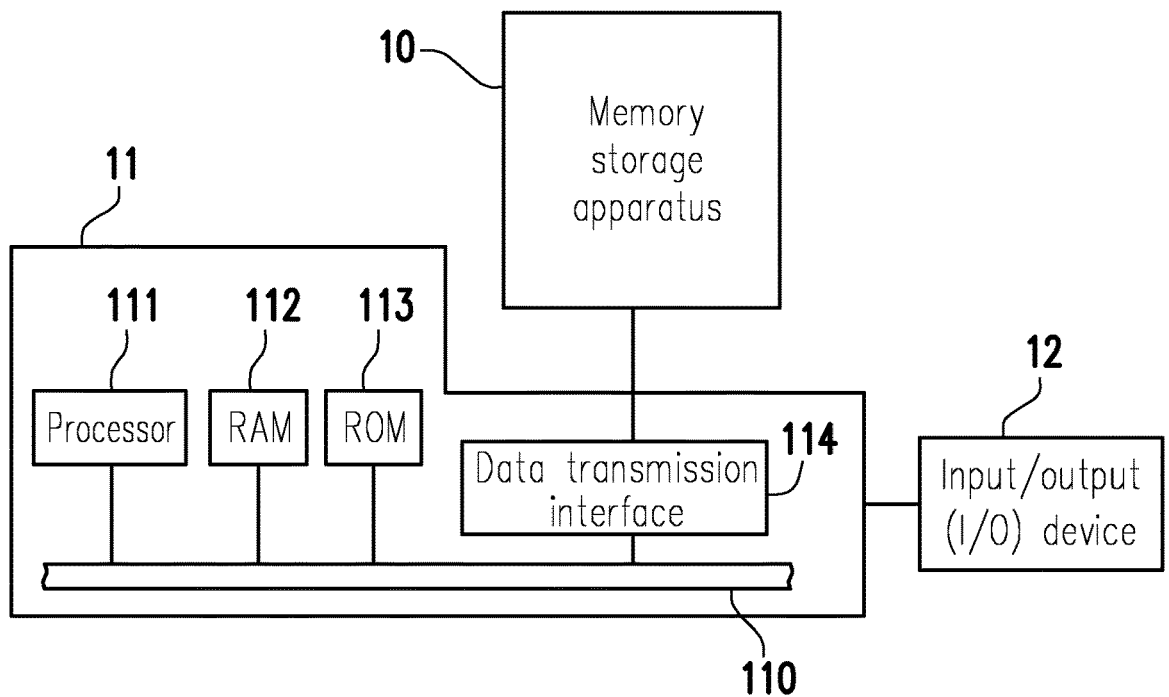
FIG. 1 is a schematic diagram of a host system, a memory storage apparatus, and an input/output (I/O) device according to an exemplary embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" may be used interchangeably herein.

Generally speaking, a memory storage apparatus (also known as a memory storage system) includes a rewritable non-volatile memory module and a controller (also known as a control circuit). The memory storage apparatus may be used with a host system such that the host system may write data to the memory storage apparatus or read data from the memory storage apparatus.

FIG. 1 is a schematic diagram of a host system, a memory storage apparatus, and an input/output (I/O) device according to an exemplary embodiment of the present disclosure.

Figure 2:
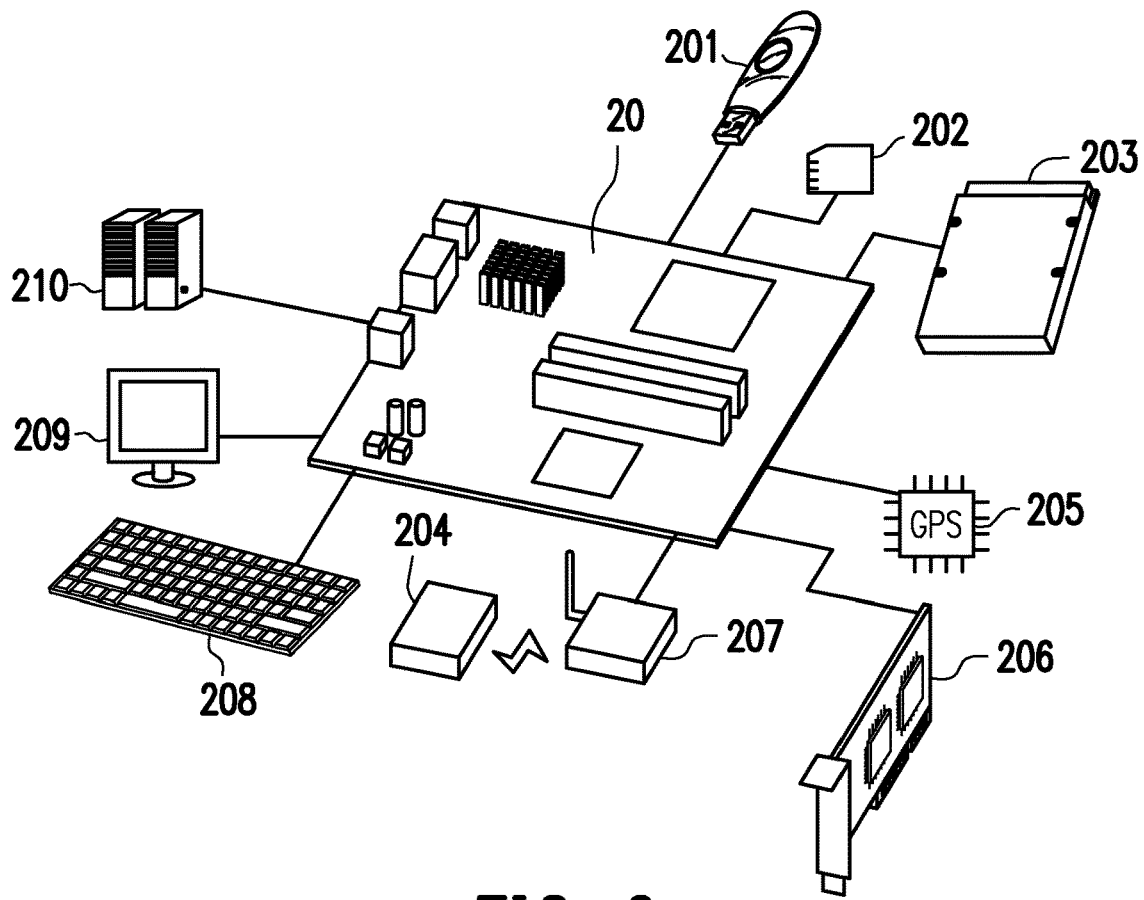
FIG. 2 is a schematic diagram of a host system, a memory storage apparatus, and an I/O device according to an exemplary embodiment of the present disclosure.

FIG. 2 is a schematic diagram of a host system, a memory storage apparatus, and an I/O device according to an exemplary embodiment of the present disclosure.

Referring to FIG. 1 and FIG. 2, the host system 11 may include a processor 111, a random access memory (RAM) 112, a read-only memory (ROM) 113 and a data transmission interface 114. The processor 111, the random access memory 112, the read-only memory 113 and the data transmission interface 114 may be coupled to a system bus 110.

In an exemplary embodiment, the host system 11 may be coupled to the memory storage apparatus 10 through the data transmission interface 114. For example, the host system 11 may store data to or read data from the memory storage apparatus 10 through the data transmission interface 114. In addition, the host system 11 may be coupled to the I/O device 12 through the system bus 110. For example, the host system 11 may transmit output signals to the I/O device 12 or receive input signals from the I/O device 12 through the system bus 110.

In an exemplary embodiment, the processor 111, the random access memory 112, the read-only memory 113 and the data transmission interface 114 may be disposed on the motherboard 20 of the host system 11. The number of data transmission interfaces 114 may be one or more. Through the data transmission interface 114, the motherboard 20 may be coupled to the memory storage apparatus 10 through a wired or wireless manner.

In an exemplary embodiment, the memory storage apparatus 10 may be, for example, a flash drive 201, a memory card 202, a solid state drive (SSD) 203 or a wireless memory storage apparatus 204. The wireless memory storage apparatus 204 may be, for example, a Near Field Communication (NFC) memory storage apparatus, a wireless fidelity (WiFi) memory storage apparatus, a Bluetooth memory storage apparatus or a Bluetooth low energy memory storage apparatus (such as iBeacon) and other memory storage apparatuses based on various wireless communication technologies. In addition, the motherboard 20 may also be coupled to a Global Positioning System (GPS) module 205, a network interface card 206, a wireless transmission device 207, a keyboard 208, a screen 209, a speaker 210, and various I/O devices through the system bus 110. For example, in an exemplary embodiment, the motherboard 20 may access the wireless memory storage apparatus 204 through the wireless transmission device 207.

In an exemplary embodiment, the host system 11 is a computer system. In an exemplary embodiment, the host system 11 may be any system that may substantially cooperate with the memory storage apparatus 10 to store data. In an exemplary embodiment, the memory storage apparatus 10 and the host system 11 may include the memory storage apparatus 30 and the host system 31 of FIG. 3 respectively.

Figure 3:
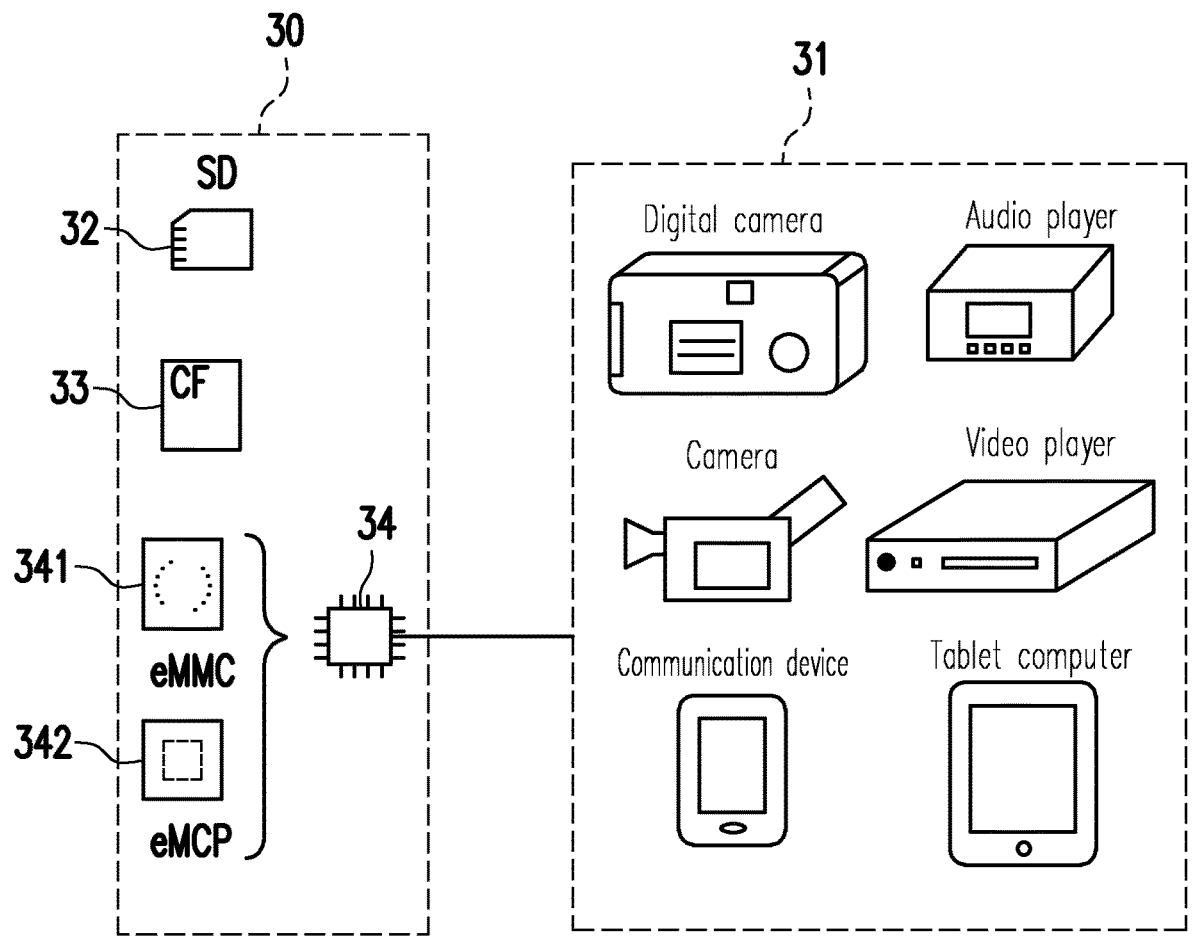
FIG. 3 is a schematic diagram of a host system and a memory storage apparatus according to an exemplary embodiment of the present disclosure.

FIG. 3 is a schematic diagram of a host system and a memory storage apparatus according to an exemplary embodiment of the present disclosure. Referring to FIG. 3, the memory storage apparatus 30 may be used in conjunction with the host system 31 to store data. For example, the host system 31 may be a digital camera, a video camera, a communication device, an audio player, a video player or a tablet computer system. For example, the memory storage apparatus 30 may be a Secure Digital (SD) card 32, a Compact Flash (CF) card 33 or an embedded storage device 34 and various non-volatile memory storage apparatuses used by the host system 31. The embedded storage device 34 includes an embedded Multi Media Card (eMMC) 341 and/or an embedded Multi Chip Package (eMCP) storage device 342 and various embedded storage devices that directly couple the memory module on the substrate of the host system.

Figure 4:
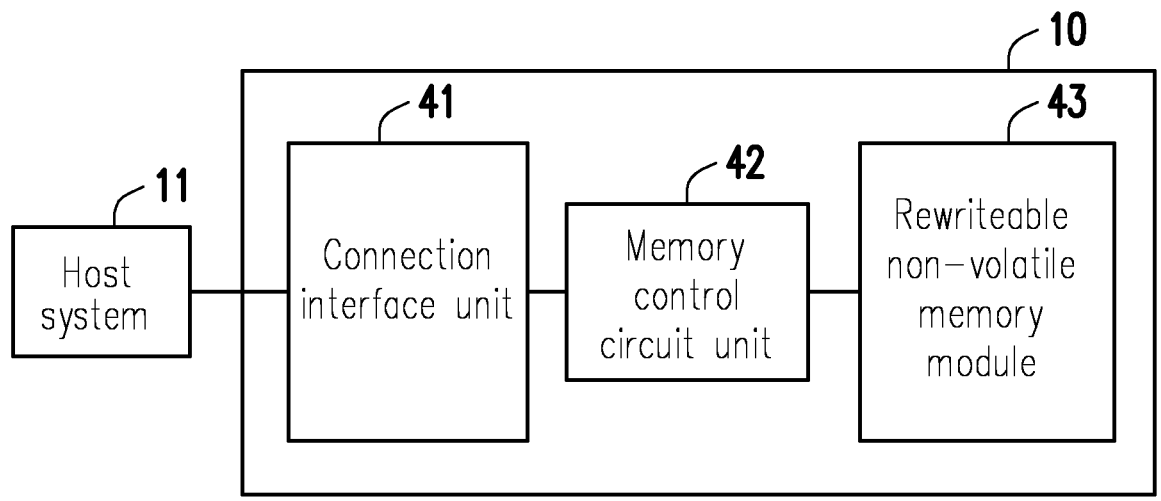
FIG. 4 is a schematic diagram of a memory storage apparatus according to an exemplary embodiment of the present disclosure.

FIG. 4 is a schematic diagram of a memory storage apparatus according to an exemplary embodiment of the present disclosure. Referring to FIG. 4, the memory storage apparatus 10 includes a connection interface unit 41, a memory control circuit unit 42 and a rewritable non-volatile memory module 43.

The connection interface unit 41 is coupled to the host system 11. The memory storage apparatus 10 may communicate with the host system 11 through the connection interface unit 41. In an exemplary embodiment, the connection interface unit 41 is compatible with the Peripheral Component Interconnect Express (PCI Express) standard. In an exemplary embodiment, the connection interface unit 41 may also be compliant with the Serial Advanced Technology Attachment (SATA) standard, Parallel Advanced Technology Attachment (PATA) standard, Institute of Electrical and Electronics Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP Interface standard, CF interface standard, Integrated Device Electronics (IDE) standard or other suitable standards. The connection interface unit 41 and the memory control circuit unit 42 may be packaged in a chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is configured to execute a plurality of logic gates or control commands implemented by hardware or by firmware and perform data writing, reading and erasing operations in the rewritable non-volatile memory module 43 according to the commands of the host system 11.

The rewritable non-volatile memory module 43 is configured to store data written by the host system 11. The rewritable non-volatile memory module 43 may include a Single Level Cell (SLC) NAND flash memory module (i.e., a flash memory module that is able to store 1 bit in one memory cell), a Multi Level Cell (MLC) NAND flash memory module (i.e., a flash memory module that is able to store 2 bits in one memory cell), a Triple Level Cell (TLC) NAND flash memory module (i.e., a flash memory module that is able to store 3 bits in one memory cell), a Quad Level Cell (QLC) NAND flash memory module (i.e., a flash memory module that is able to store 4 bits in one memory cell), other flash memory modules, or other memory modules with the same characteristics.

Each memory cell in the rewritable non-volatile memory module 43 stores one or more bits based on changes in voltage (hereinafter also referred to as threshold voltage). Specifically, there is a charge trapping layer between the control gate and the channel of each memory cell. By applying a write voltage to the control gate, the amount of electrons in the charge trapping layer may be changed, thereby changing the threshold voltage of the memory cell. This operation of changing the threshold voltage of the memory cell is also called "writing data into the memory cell" or "programming the memory cell". As the threshold voltage changes, each memory cell in the rewritable non-volatile memory module 43 has multiple storage states. By applying a read voltage, it is possible to determine which storage state a memory cell belongs to, thereby obtaining one or more bits stored in the memory cell.

In an exemplary embodiment, the memory cells of the rewritable non-volatile memory module 43 may constitute multiple physical programming units, and the physical programming units may constitute multiple physical erasing units. Specifically, memory cells on the same word line may form one or more physical programming units. If each memory cell stores more than 2 bits, the physical programming units on the same word line may at least be classified into lower physical programming units and upper physical programming units. For example, the Least Significant Bit (LSB) of a memory cell belongs to the lower physical programming unit, and the Most Significant Bit (MSB) of a memory cell belongs to the upper physical programming unit. Generally speaking, in MLC NAND flash memory, the writing speed of the lower physical programming unit may be greater than the writing speed of the upper physical programming unit, and/or the reliability of the lower physical programming unit may be higher than the reliability of the upper physical programming unit.

In an exemplary embodiment, the physical programming unit is the minimum unit of programming. That is, the physical programming unit is the minimum unit for writing data. For example, the physical programming unit may be a physical page or a physical sector. If the physical programming units are physical pages, these physical programming units may include data bit areas and redundancy bit areas. The data bit area contains multiple physical sectors to store user data, while the redundancy bit area is configured to store system data (for example, management data such as error correction codes). In an exemplary embodiment, the data bit area includes 32 physical sectors, and the size of one physical sector is 512 bytes (B). However, in other exemplary embodiments, the data bit area may also include 8, 16, or more or less physical sectors, and the size of each physical sector may also be larger or smaller. On the other hand, the physical erasing unit is the minimum unit for erasing data. That is, each physical erasing unit contains a minimum number of memory cells that are erased together. For example, the physical erasing unit is a physical block.

Figure 5:
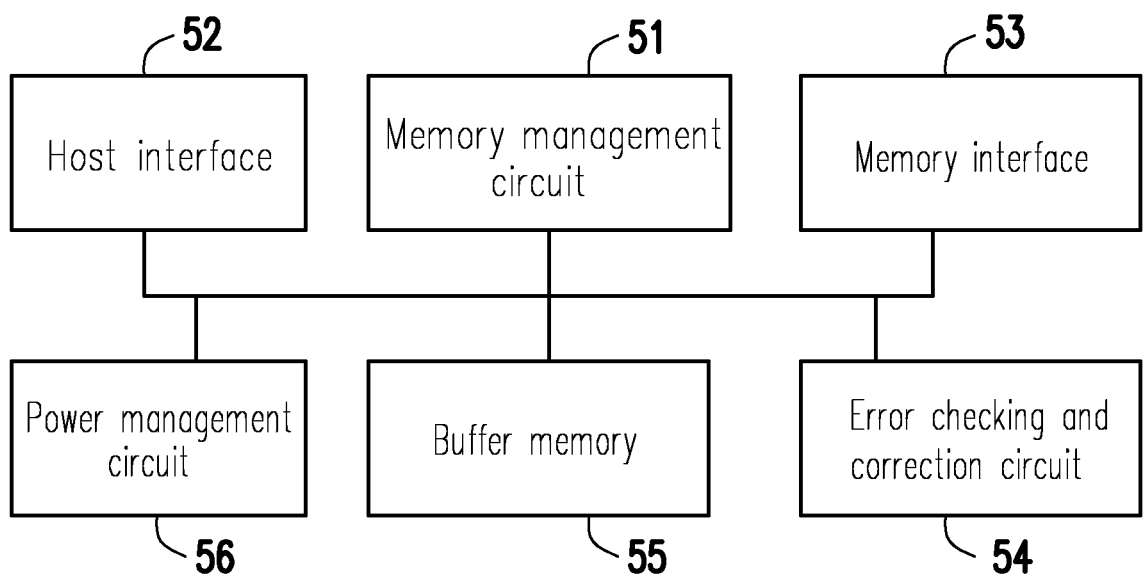
FIG. 5 is a schematic diagram of a memory control circuit unit according to an exemplary embodiment of the present disclosure.

FIG. 5 is a schematic diagram of a memory control circuit unit according to an exemplary embodiment of the present disclosure. Referring to FIG. 5, the memory control circuit unit 42 includes a memory management circuit 51, a host interface 52 and a memory interface 53.

The memory management circuit 51 is configured to control the overall operation of the memory control circuit unit 42. Specifically, the memory management circuit 51 has a plurality of control commands, and when the memory storage apparatus 10 is operating, these control commands may be executed to perform operations such as writing, reading, and erasing data. In the description of the operation of the memory management circuit 51 below, the description is equivalent to describing the operation of the memory control circuit unit 42 and the memory storage apparatus 10.

In an exemplary embodiment, the control commands of the memory management circuit 51 are implemented in the form of firmware. For example, the memory management circuit 51 has a microprocessor unit (not shown) and a read-only memory (not shown), and these control commands are burned into the read-only memory. When the memory storage apparatus 10 is operating, these control commands may be executed by the microprocessor unit to perform data writing, reading, erasing and other operations.

In an exemplary embodiment, the control commands of the memory management circuit 51 may also be stored in a specific area (for example, the system area in the memory module dedicated to storing system data) of the rewritable non-volatile memory module 43 in the form of program code. In addition, the memory management circuit 51 has a microprocessor unit (not shown), a read-only memory (not shown) and a random access memory (not shown). In particular, the read-only memory has a boot code, and when the memory control circuit unit 42 is enabled, the microprocessor unit may first execute the boot code to load the control commands stored in the rewritable non-volatile memory module 43 into the random access memory of the memory management circuit 51. Afterwards, the microprocessor unit may run these control commands to perform operations such as writing, reading and erasing data.

In an exemplary embodiment, the control commands of the memory management circuit 51 may also be implemented in the form of hardware. For example, the memory management circuit 51 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage the memory cells or memory cell groups of the rewritable non-volatile memory module 43. The memory writing circuit is configured to issue a write command sequence to the rewritable non-volatile memory module 43 to write data into the rewritable non-volatile memory module 43. The memory reading circuit is configured to issue a read command sequence to the rewritable non-volatile memory module 43 to read data from the rewritable non-volatile memory module 43. The memory erasing circuit is configured to issue an erasing command sequence to the rewritable non-volatile memory module 43 to erase data from the rewritable non-volatile memory module 43. The data processing circuit is configured to process data to be written to the rewritable non-volatile memory module 43 and data to be read from the rewritable non-volatile memory module 43. The write command sequence, the read command sequence and the erase command sequence may each include one or more program codes or command codes and are used to instruct the rewritable non-volatile memory module 43 to perform corresponding write, read and erase operations. In an exemplary embodiment, the memory management circuit 51 may also issue other types of command sequences to the rewritable non-volatile memory module 43 to instruct the execution of corresponding operations.

The host interface 52 is coupled to the memory management circuit 51. The memory management circuit 51 may communicate with the host system 11 through the host interface 52. The host interface 52 may be configured to receive and identify commands and data transmitted by the host system 11. For example, commands and data sent by the host system 11 may be sent to the memory management circuit 51 through the host interface 52. In addition, the memory management circuit 51 may transmit data to the host system 11 through the host interface 52. In the exemplary embodiment, the host interface 52 is compatible with the PCI Express standard. However, it should be understood that the present disclosure is not limited thereto. The host interface 52 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard or other suitable data transmission standards.

The memory interface 53 is coupled to the memory management circuit 51 and configured to access the rewritable non-volatile memory module 43. For example, the memory management circuit 51 may access the rewritable non-volatile memory module 43 through the memory interface 53. That is to say, the data to be written to the rewritable non-volatile memory module 43 may be converted into a format acceptable to the rewritable non-volatile memory module 43 through the memory interface 53. Specifically, if the memory management circuit 51 is to access the rewritable non-volatile memory module 43, the memory interface 53 may send a corresponding command sequence. For example, these command sequences may include a write command sequence instructing to write data, a read command sequence instructing to read data, an erase command sequence instructing to erase data, and other corresponding command sequences instructing to perform various memory operations (e.g., change read voltage levels or perform garbage collection (GC) operations, etc.). These command sequences are generated, for example, by the memory management circuit 51 and transmitted to the rewritable non-volatile memory module 43 through the memory interface 53. These command sequences may include one or more signals or data on the bus. These signals or data may include scripts or program codes. For example, the read command sequence may include the read identification code, memory address and other information.

In an exemplary embodiment, the memory control circuit unit 42 further includes an error checking and correction circuit 54, a buffer memory 55 and a power management circuit 56.

The error checking and correction circuit 54 is coupled to the memory management circuit 51 and is configured to perform error checking and correction operations to ensure the accuracy of the data. Specifically, when the memory management circuit 51 receives a write command from the host system 11, the error checking and correction circuit 54 generates a corresponding error correcting code (ECC) and/or error detecting code (EDC) in response to the write command, and the memory management circuit 51 may write the data corresponding to the write command and the corresponding error correcting code and/or error detecting code into the rewritable non-volatile memory module 43. Afterwards, when the memory management circuit 51 reads data from the rewritable non-volatile memory module 43, the memory management circuit 51 may also read the ECC and/or EDC corresponding to the data, and the error checking and correction circuit 54 may perform error checking and correction operations on the read data based on this ECC and/or EDC. For example, the error checking and correction circuit 54 may use a Low Density Parity Check code (LDPC code), a BCH code, a Reed-Solomon code (RS code), an Exclusive OR (XOR) code and other encoding/decoding algorithms to encode and decode data.

The buffer memory 55 is coupled to the memory management circuit 51 and configured to temporarily store data. The power management circuit 56 is coupled to the memory management circuit 51 and configured to control the power supply of the memory storage apparatus 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
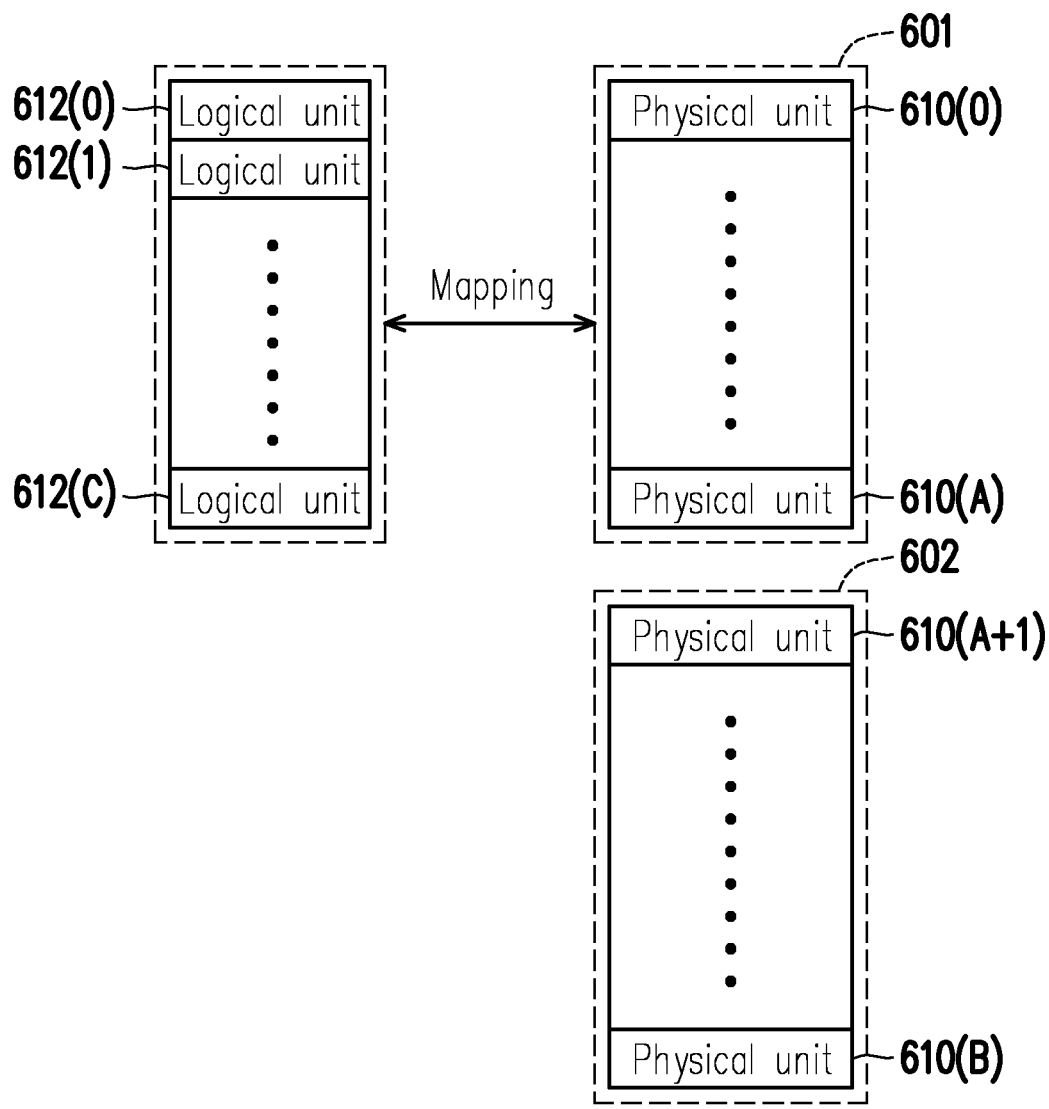
FIG. 6 is a schematic diagram of managing a rewritable non-volatile memory module according to an exemplary embodiment of the present disclosure.

FIG. 6 is a schematic diagram of managing a rewritable non-volatile memory module according to an exemplary embodiment of the present disclosure. Referring to FIG. 6, the memory management circuit 51 may logically group the physical units 610(0) to 610(B) in the rewritable non-volatile memory module 43 into a storage area 601 and a spare area 602.

In an exemplary embodiment, a physical unit refers to a physical address or a physical programming unit. In an exemplary embodiment, a physical unit may also be composed of multiple consecutive or non-consecutive physical addresses. In an exemplary embodiment, a physical unit may also refer to a virtual block (VB). A virtual block may include multiple physical addresses or multiple physical programming units. In an exemplary embodiment, a virtual block may include one or more physical erasing units.

In an exemplary embodiment, the physical units 610(0) to 610(A) in the storage area 601 are used to store user data (e.g., user data from the host system 11 of FIG. 1). For example, the physical units 610(0) to 610(A) in the storage area 601 may store valid data and invalid data. The physical units 610(A+1) to 610(B) in the spare area 602 do not store data (e.g., valid data). For example, if a certain physical unit does not store valid data, this physical unit may be associated (or added) to the spare area 602. In addition, the physical units in the spare area 602 (or the physical units that do not store valid data) may be erased. As new data is written, one or more physical units may be retrieved from the spare area 602 to store the new data. In an exemplary embodiment, the spare area 602 is also called as a free pool.

In an exemplary embodiment, the memory management circuit 51 may configure the logical units 612(0) to 612(C) to map the physical units 610(0) to 610(A) in the storage area 601. In an exemplary embodiment, each logical unit corresponds to a logical address. For example, a logical address may include one or more logical block addresses (LBA) or other logical management units. In an exemplary embodiment, a logical unit may also correspond to a logical programming unit or be composed of multiple consecutive or non-consecutive logical addresses.

It should be noted that one logical unit may be mapped to one or more physical units. If a certain physical unit is currently mapped by a certain logical unit, it means that the data currently stored in this physical unit includes valid data. On the contrary, if a certain physical unit is not currently mapped by any logical unit, it means that the data currently stored in this physical unit is invalid data.

In an exemplary embodiment, the memory management circuit 51 may record management data (also referred to as logical-to-physical mapping information) describing the mapping relationship between logical units and physical units in at least one logical-to-physical mapping table (L2P table). When the host system 11 is to read data from or write data to the memory storage apparatus 10, the memory management circuit 51 may access the rewritable non-volatile memory module 43 according to the information in the L2P table.

In an exemplary embodiment, the memory management circuit 51 may perform specific operations (also called first operations) on a plurality of physical units in the rewritable non-volatile memory module 43 to obtain at least one parameter (also called quality estimation parameter) corresponding to the physical units. In other words, the memory management circuit 51 may obtain the quality estimation parameters corresponding to the physical units through the first operations.

In an exemplary embodiment, the quality estimation parameters may reflect data storage qualities of the physical units. For example, if the data storage quality of a certain physical unit is higher, it means that the physical unit has a better ability to store data. In an exemplary embodiment, the data storage quality of a physical unit is related to at least one of a bit error rate (BER) and a wear degree of the physical unit. For example, the data storage quality of a physical unit may be negatively related to the bit error rate and/or the wear degree of the physical unit. That is, if the bit error rate and/or the wear degree of a physical unit is lower, it means that the data storage quality of this physical unit is higher.

In an exemplary embodiment, the quality estimation parameters may reflect at least one of the bit error rate and the wear degree of each of the plurality of physical units. Taking a certain physical unit (also called target physical unit) in the rewritable non-volatile memory module 43 as an example, the quality estimation parameter corresponding to the target physical unit may reflect the bit error rate and/or the wear degree of the target physical unit.

In an exemplary embodiment, the first operations may include one or more operations that may be used to obtain the quality estimation parameters. For example, the first operations may include a scan operation, a data read operation, and/or a data decoding operation performed on the target physical unit, and the types of the first operations is not limited thereto. In an exemplary embodiment, the first operations are only executed when the memory storage apparatus 10 (or the rewritable non-volatile memory module 43) is in an idle state (or not in a busy state) to obtain the quality estimation parameter corresponding to the target physical unit. In an exemplary embodiment, the first operations may also be executed at any point in time. Then, the memory management circuit 51 may record the quality estimation parameter corresponding to the target physical unit according to the execution result of the first operations.

In an exemplary embodiment, the quality estimation parameter corresponding to the target physical unit may include an error bit count. In an exemplary embodiment, the error bit count may reflect the total number of error bits included in the data read from the target physical unit. In an exemplary embodiment, the error bit count may reflect the bit error rate of the target physical unit. For example, this error bit count may be positively related to the bit error rate of the target physical unit. That is, if the error bit count is larger, it means that the bit error rate of the target physical unit is higher (that is, the data read from the target physical unit contains more error bits). In an exemplary embodiment, the quality estimation parameter corresponding to the target physical unit may also include any parameter that may reflect the bit error rate of the target physical unit, which is not limited by the present disclosure.

In an exemplary embodiment, the quality estimation parameter corresponding to the target physical unit may include a wear estimation value. For example, the wear estimation value may reflect the wear degree of the target physical unit. For example, the wear estimation value may be positively related to the wear degree of the target physical unit. That is, if the wear estimation value is larger, it means that the wear degree of the target physical unit is higher. For example, the wear estimation value may include at least one of a read count, a program count, and an erase count. The read count reflects the number of times the target physical unit has been read. The program count reflects the number of times the target physical unit has been programmed. The erase count reflects the number of times the target physical unit has been erased. In an exemplary embodiment, the quality estimation parameter corresponding to the target physical unit may also include any parameter that may reflect the wear degree of the target physical unit, which is not limited by the present disclosure.

In an exemplary embodiment, the memory management circuit 51 may establish a check list (also called a quick check list) according to the quality estimation parameters. The check list may record index information of a part of the physical units (also called the first physical unit) among the physical units. In particular, the number of first physical units must be less than the total number of physical units in the rewritable non-volatile memory module 43. From another perspective, this check list is not used to record the index information of all (available) physical units in the rewritable non-volatile memory module 43.

In an exemplary embodiment, the first physical unit includes at least one physical unit in the rewritable non-volatile memory module 43 whose data storage quality is relatively poor. In an exemplary embodiment, the memory management circuit 51 may classify multiple physical units in the rewritable non-volatile memory module 43 according to the quality estimation parameter. For example, the classification result of a certain physical unit may reflect whether the physical unit is a physical unit with relatively poor data storage quality in the rewritable non-volatile memory module 43. In response to a certain physical unit being a physical unit with relatively poor data storage quality in the rewritable non-volatile memory module 43, the memory management circuit 51 may record or add the index information of this physical unit to the check list. However, if a certain physical unit does not belong to the physical unit with relatively poor data storage quality in the rewritable non-volatile memory module 43, the memory management circuit 51 may not record the index information of this physical unit into the check list. Alternatively, in an exemplary embodiment, in response to a certain physical unit not belonging to a physical unit with relatively poor data storage quality in the rewritable non-volatile memory module 43, the memory management circuit 51 may remove the index information of this physical unit from the physical unit from the check list.

In an exemplary embodiment, the first physical unit (i.e., the physical unit in the rewritable non-volatile memory module 43 with relatively poor data storage quality) includes at least one physical unit with data storage quality being lower than a threshold (also referred to as quality threshold) in the rewriteable non-volatile memory module 43. In an exemplary embodiment, the memory management circuit 51 may record index information of at least one physical unit with data storage quality being lower than the quality threshold into the check list according to the quality estimation parameters of multiple physical units in the rewritable non-volatile memory module 43. For example, in response to the quality estimation parameter of a certain physical unit reflecting that the data storage quality of this physical unit is lower than the quality threshold, the memory management circuit 51 may record the index information of this physical unit into the check list. However, if the quality estimation parameter of a certain physical unit reflects that the data storage quality of this physical unit is not lower than the quality threshold, the memory management circuit 51 may not record the index information of this physical unit into the check list (or the index information of this physical unit may be removed from the check list).

In an exemplary embodiment, the memory management circuit 51 may determine whether the data storage quality of a certain physical unit in the rewritable non-volatile memory module 43 is lower than the quality threshold according to a numerical relative relationship between the quality estimation parameter of this physical unit and a threshold value. In an exemplary embodiment, in response to the numerical relative relationship between the quality estimation parameter of a certain physical unit and the threshold value being a specific numerical relationship (also called a first numerical relationship), the memory management circuit 51 may determine that the data storage quality of this physical unit is lower than the quality threshold. However, in response to the numerical relative relationship between the quality estimation parameter of a certain physical unit and the threshold value being another numerical relationship (also called a second numerical relationship), the memory management circuit 51 may determine that the data storage quality of this physical unit is not lower than the quality threshold.

In an exemplary embodiment, in response to that a numerical relative relationship between the error bit count (i.e., the quality estimation parameter) of a certain physical unit and a threshold value is the error bit count being greater than the threshold value (i.e., the first numerical relationship), the memory management circuit 51 may determine that the data storage quality of this physical unit is lower than the quality threshold. However, in response to that a numerical relative relationship between the error bit count (i.e., the quality estimation parameter) of a certain physical unit and a threshold value is the error bit count being not greater than the threshold value (i.e., the second numerical relationship), the memory management circuit 51 may determine that the data storage quality of this physical unit is not lower than the quality threshold.

In an exemplary embodiment, in response to that a numerical relative relationship between the wear estimation value (i.e., the quality estimation parameter) of a certain physical unit and a threshold value is the wear estimation value being greater than the threshold value (i.e., the first numerical relationship), the memory management circuit 51 may determine that the data storage quality of this physical unit is lower than the quality threshold. However, in response to that a numerical relative relationship between the wear estimation value (i.e., the quality estimation parameter) of a certain physical unit and a threshold value is the wear estimation value being not greater than the threshold value (i.e., the second numerical relationship), the memory management circuit 51 may determine that the data storage quality of this physical unit is not lower than the quality threshold.

In an exemplary embodiment, the memory management circuit 51 may sort multiple physical units in the rewritable non-volatile memory module 43 according to the quality estimation parameter. For example, the sorting results of the multiple physical units may reflect the bit error rates and/or the wear degrees of the multiple physical units from large to small or from small to large. The memory management circuit 51 may select a part of the physical units from the multiple physical units (for example, at least one physical unit with relatively poor data storage quality among the multiple physical units) as the first physical unit based on the sorting results of the multiple physical units. Then, the memory management circuit 51 may record the index information of the first physical unit into the check list.

Figure 7:
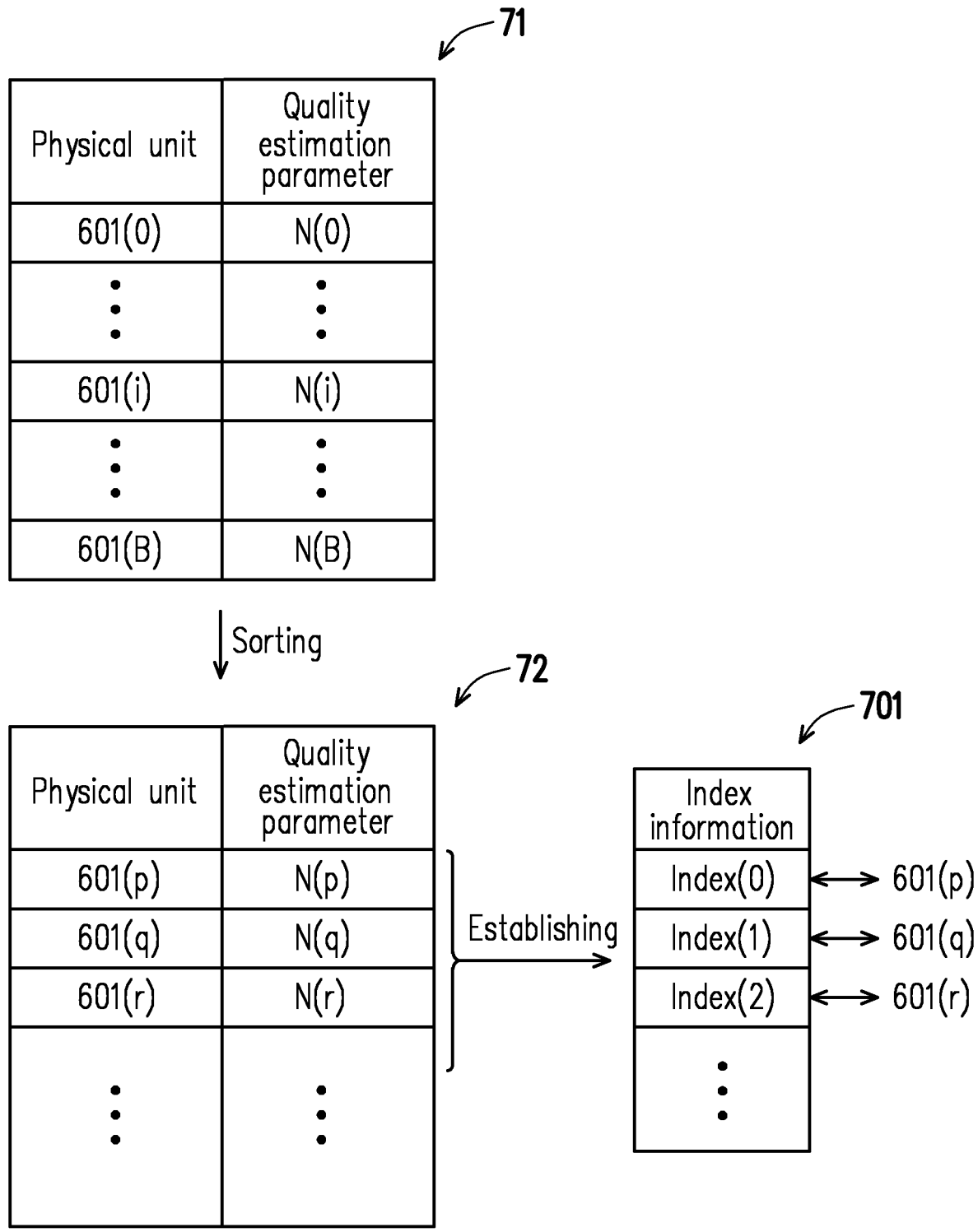
FIG. 7 is a schematic diagram of sorting multiple physical units and establishing a check list according to the quality estimation parameter according to an exemplary embodiment of the present disclosure.

FIG. 7 is a schematic diagram of sorting multiple physical units and establishing a check list according to the quality estimation parameter according to an exemplary embodiment of the present disclosure. Referring to FIG. 7, the memory management circuit 51 may record the quality estimation parameters N(0) to N(B) corresponding to the physical units 601(0) to 601(B) in the management table 71. The quality estimation parameter N(i) may reflect the bit error rate and/or the wear degree of the physical unit 601(i) (that is, the target physical unit). For example, the quality estimation parameter N(i) may be positively related to the bit error rate and/or the wear degree of the physical unit 601(i).

In an exemplary embodiment, the memory management circuit 51 may sort the physical units 601(0) to 601(B) according to the quality estimation parameters N(0) to N(B). For example, the management table 72 may be used to record the sorting results of physical units 601(0) to 601(B). For example, according to the management table 72, the quality estimation parameter N(p) of the physical unit 601(p) is greater than the quality estimation parameter N(q) of the physical unit 601(q), and the quality estimation parameter N(q) of the physical unit 601(q) is greater than the quality estimation parameter N(r) of physical unit 601(r), and so on. In other words, the sorting results of physical units 601(0) to 601(B) recorded in the management table 72 may reflect that the quality estimation parameter N(p) is the largest of the quality estimation parameters N(0) to N(B) (that is, among physical units 601(0) to 601(B), physical unit 601(p) has the worst data storage quality), quality estimation parameter N(q) is the second largest of the estimation parameters N(0) to N(B) (that is, among physical units 601(0) to 601(B), the data storage quality of physical unit 601(q) is only better than the data storage quality of physical unit 601(p)), and so on.

In an exemplary embodiment, the memory management circuit 51 may select a part of physical units with relatively poor data storage quality from the physical units 601(0) to 601(B) as the first physical unit according to the management table 72. For example, the first physical unit may include physical units 601(p), 601(q), and 601(r). Then, the memory management circuit 51 may establish the check list 701 according to the first physical unit. For example, the memory management circuit 51 may record the index information corresponding to the first physical unit into the check list 701. For example, the index information Index (0) to Index (2) in the check list 701 may correspond to physical units 601(p), 601(q), and 601(r), respectively. It should be noted that the total number of the first physical unit must be less than the total number of physical units 601(0) to 601(B). For example, the check list 701 may record at most index information Index (0) to Index (M) corresponding to M+1 physical units, and M is smaller than B.

It should be noted that in the exemplary embodiment of FIG. 7, the physical units 601(0) to 601(B) are sorted from large to small according to the corresponding quality estimation parameters, so as to facilitate the selection of at least one physical unit with relatively poor data storage quality as the first physical unit from the physical units 601(0) to 601(B). However, in another exemplary embodiment, the physical units 601(0) to 601(B) may also be sorted from small to large according to the corresponding quality estimation parameter, which is not limited by the present disclosure. In an exemplary embodiment, the check list may also be implemented by adding tags or corresponding index information to some physical units (i.e., the first physical unit) as shown in the management table 72, which is not limited by the present disclosure.

In an exemplary embodiment, after the check list is established, in response to the quality estimation parameters being updated, the memory management circuit 51 may update the check list. For example, in the operation of updating the check list, the memory management circuit 51 may add index parameter of at least one physical unit (also referred to as second physical unit) in the rewritable non-volatile memory module 43 into the check list, and/or remove index parameter of at least one physical unit (also referred to as third physical unit) in the rewritable non-volatile memory module 43 from the check list.

In an exemplary embodiment, it is assumed that after the check list 701 of FIG. 7 is established, the bit error rate and/or the wear degree of the physical unit 601(k) (i.e., the second physical unit) changes. In response to the change of the bit error rate and/or the wear degree of the physical unit 601(k), the quality estimation parameter N(k) corresponding to the physical unit 601(k) may be changed (i.e., updated). In response to the change of the quality estimation parameter N(k) of the physical unit 601(k), the sorting results of the physical units 601(0) to 601(B) reflected by the management table 72 may be changed accordingly. According to the updated sorting results of the physical units 601(0) to 601(B), the physical unit 601(k) may be selected as the new first physical unit, and the index information of physical unit 601(k) may be added into the check list 701. In addition, the index information of the physical unit 601(k) newly added to the check list 701 may be used to replace the index information of a certain physical unit (i.e., the third physical unit) in the check list 701. That is, in response to the index information of the physical unit 601(k) being added into the check list 701, the index information of the third physical unit may be removed from the check list 701. Thereby, as the quality estimation parameters corresponding to at least some of the physical units change, the index information of at least one physical unit with relatively poor data storage quality in the rewritable non-volatile memory module 43 may be continuously recorded in the check list 701.

In an exemplary embodiment, the memory management circuit 51 may determine whether at least one condition (also referred to as default condition) is satisfied. In response to the default condition being satisfied, the memory management circuit 51 may perform a status scanning on the first physical unit according to the index information in the check list. However, if the default condition is not satisfied, the memory management circuit 51 may not perform the status scanning.

In an exemplary embodiment, the memory management circuit 51 may determine whether the memory storage apparatus 10 is powered on (for example, turned on) or waked up (for example, switched from a power saving mode to a normal operating mode). In response to the memory storage apparatus 10 being powered on or waked up, the memory management circuit 51 may determine that the default condition is satisfied. However, if the memory storage apparatus 10 is not powered on (for example, the memory storage apparatus 10 continues to be in a shutdown state) or is not awakened (for example, the memory storage apparatus 10 continues to be in the power saving mode), the memory management circuit 51 may determine that the default condition is not satisfied.

In an exemplary embodiment, the result of the status scanning performed on the first physical unit may reflect the current data storage quality of the first physical unit (e.g., the current bit error rate of the first physical unit). Based on the results of the status scanning, the memory management circuit 51 may perform specific operation (also referred to as second operation). In an exemplary embodiment, according to the result of the status scanning performed on the first physical unit, the memory management circuit 51 may not perform any operation (for example, not perform the second operation).

In an exemplary embodiment, based on the result of the status scanning performed on the first physical unit, the memory management circuit 51 may obtain information (also referred to as representative information) which may describe the overall data storage quality of the rewritable non-volatile memory module 43. In other words, the representative information may reflect the overall data storage quality of the rewritable non-volatile memory module 43 (such as the physical units 601(0) to 601(B) in FIG. 7). Afterwards, the memory management circuit 51 may perform the second operation according to the representative information. In an exemplary embodiment, the representative information may be obtained by performing status scanning on only a small part of the physical units (i.e., the first physical unit) in the rewritable non-volatile memory module 43, rather than performing status scanning on more or all of the physical units in the rewritable non-volatile memory module 43 (i.e., performing the full-disc scanning).

In an exemplary embodiment, status scanning and subsequent second operation performed on the first physical unit may help to quickly perform a relatively efficient (or relatively important) maintenance on the rewritable non-volatile memory module 43 in a situation that the default condition is satisfied (for example, when the memory storage apparatus 10 has just been powered on or waked up), so as to improve subsequent operating performance (such as operating stability) of the memory storage apparatus 10. That is to say, compared with full-disc scanning that traditionally takes a long time to execute, in the situation that the default condition is satisfied, the status scanning and relatively efficient maintenance operations may be quickly performed on merely the first physical unit, thereby effectively improving the maintenance efficiency of rewriteable non-volatile memory module 43.

In an exemplary embodiment, after the memory storage apparatus 10 is just powered on or waked up (that is, the default condition is satisfied), the memory storage apparatus 10 (or rewritable non-volatile memory module 43) may be in an idle status within a period of time (also referred to as idle time range). For example, within the idle time range, the memory storage apparatus 10 may automatically perform initialization and/or handshake operation with the host system 11. Therefore, memory storage apparatus 10 (or rewritable non-volatile memory module 43) may be in the idle status during this idle time range. In an exemplary embodiment, the idle time range is not long enough to perform a complete full-disc scanning on the rewritable non-volatile memory module 43. However, in an exemplary embodiment, by effectively utilizing this idle time range to quickly perform relatively efficient status scanning and maintenance operations on the rewritable non-volatile memory module 43 (i.e., the first physical unit), the maintenance efficiency of the rewritable non-volatile memory module 43 may be effectively improved. In an exemplary embodiment, the second operation may include a maintenance operation for the rewritable non-volatile memory module 43 that may be completely performed within the idle time range.

In an exemplary embodiment, the second operation may include adjusting the read voltage level corresponding to the first physical unit. For example, according to the result of the status scanning performed on the first physical unit, the memory management circuit 51 may adjust at least one read voltage level used to read data from the first physical unit to improve the correctness of data read from the first physical unit by using the read voltage level. In particular, by quickly performing the adjusting of the read voltage level for the first physical unit (that is, the physical unit with relatively poor data storage quality in the rewritable non-volatile memory module 43) after the memory storage apparatus 10 has just been powered on or waked up, the time spent on repeated reading and decoding of data due to serious reading errors of data may be effectively reduced. In this way, the subsequent operating performance (such as operating stability) of the memory storage apparatus 10 may be effectively improved.

In an exemplary embodiment, the second operation may include adjusting maintenance strategies for multiple physical units in the rewritable non-volatile memory module 43. For example, based on the result of the status scanning performed on the first physical unit, the memory management circuit 51 may adjust the frequency of executions of a wide range data scanning (such as full-disc scanning) on multiple physical units in the rewritable non-volatile memory module 43.

In an exemplary embodiment, it is assumed that a previous maintenance strategy for multiple physical units in the rewritable non-volatile memory module 43 includes performing a full-disc scanning on the rewritable non-volatile memory module 43 every 30 days. In response to the result of the status scanning performed on the first physical unit being a specific result (also referred to as the first result) (for example, the first result may reflect the continuous deterioration of the data storage quality of the first physical unit), the memory management circuit 51 may determine that the overall data storage quality of the rewritable non-volatile memory module 43 may also continue to deteriorate. For example, the continuous deterioration of the data storage quality of the first physical unit may be presented in the continuous increase of the bit error rate of the first physical unit. Therefore, in response to the result of the status scanning performed on the first physical unit being the first result, the memory management circuit 51 may adjust (e.g., increase) the frequency of performing the full-disc scanning on the rewritable non-volatile memory module 43 to every 20 days or every 10 days. Thereafter, during the full-disc scanning process, once a physical unit that meets a data refresh condition is found, the memory management circuit 51 may immediately perform data refresh on the physical unit. For example, the data refresh includes reading data from a specific physical unit, decoding the data to correct errors in the data, and then saving the corrected data back to another physical unit. In this way, in a situation that the overall data storage quality of the rewritable non-volatile memory module 43 continues to deteriorate, by increasing the frequency of performing the full-disc scanning on the rewritable non-volatile memory module 43, the performance (e.g., the operating stability) of the memory storage apparatus 10 may be effectively improved, and thereby extending the lifetime of the rewritable non-volatile memory module 43.

On the other hand, in response to the result of the status scanning performed on the first physical unit being another result (also referred to as second result) (for example, the data storage quality of the first physical unit does not continue to deteriorate or even becomes better), the memory management circuit 51 may determine that the overall data storage quality of the rewritable non-volatile memory module 43 has not continued to deteriorate or even improved. For example, the situation of that the data storage quality of the first physical unit does not continue to deteriorate or even becomes better, may be presented in the continuous decrease (or not increase) of the bit error rate of the first physical unit. Therefore, in response to the result of the status scanning performed on the first physical unit being the second result, the memory management circuit 51 may not adjust the frequency of performing the full-disc scanning on the rewritable non-volatile memory module 43, or may perform the full-disc scanning on the rewritable non-volatile memory module 43, or may adjust (for example, reduce) the frequency of performing the full-disc scanning on the rewritable non-volatile memory module 43 to every 40 days. In this way, in a situation that the overall data storage quality of the rewritable non-volatile memory module 43 does not continue to deteriorate or even becomes better, by decreasing the frequency of performing the full-disc scanning on the rewritable non-volatile memory module 43, the system resource may be effectively saved and the lifetime of the rewritable non-volatile memory module 43 may be extended without effecting the operating performance (e.g., the operating stability) of the storage apparatus 10.

In an exemplary embodiment, the memory management circuit 51 may adjust the quality threshold according to the result of the status scanning performed on the first physical unit. For example, the quality threshold may be used to control manage whether to record index information of specific physical unit in the rewritable non-volatile memory module 43 into the check list. The relevant operation have been introduced above and will not be repeated here.

In an exemplary embodiment, in response to the result of the status scanning performed on the first physical unit being the first result (that is, the data storage quality of the first physical unit continues to deteriorate), the memory management circuit 51 may increase the quality threshold. In particular, after the quality threshold is increased, the total number of physical units in the rewritable non-volatile memory module 43 with data storage quality lower than the quality threshold (i.e. the total number of the first physical unit) may be increased, resulting in index information corresponding to more physical units with data storage quality lower than the quality threshold may be added into the check list. After the index information of more physical units is added into the check list, the memory management circuit 51 may perform the status scanning on much more physical units (i.e., the first physical unit) according to the check list, and the result of the status scanning may much more accurately reflect the overall data storage quality of the rewritable non-volatile memory module 43. In this way, in a situation that the overall data storage quality of the rewritable non-volatile memory module 43 continues to deteriorate, the maintenance efficiency of the rewritable non-volatile memory module 43 may be effectively improved (for example, the accuracy of the maintenance operation performed on the rewritable non-volatile memory module 43 may be improved), thereby extending the lifetime of the rewritable non-volatile memory module 43.

On the other hand, in response to the result of the status scanning performed on the first physical unit being the second result (that is, the data storage quality of the first physical unit does not continue to deteriorate), the memory management circuit 51 may decrease (or not adjust) the quality threshold. In particular, after the quality threshold is decreased, the total number of physical units with data storage quality lower than the quality threshold in the rewritable non-volatile memory module 43 (i.e., the total number of the first physical units) may be reduced, resulting in the index information of fewer physical units being recorded into the check list. In this way, in a situation that the overall data storage quality of the rewritable non-volatile memory module 43 does not continue to deteriorate or even improves, the execution efficiency of subsequent status scanning performed according to the check list may be effectively improved (for example, the completion of the status scanning performed according to the check list may be accelerated), thereby improving the performance of the rewritable non-volatile memory module 43.

Figure 8:
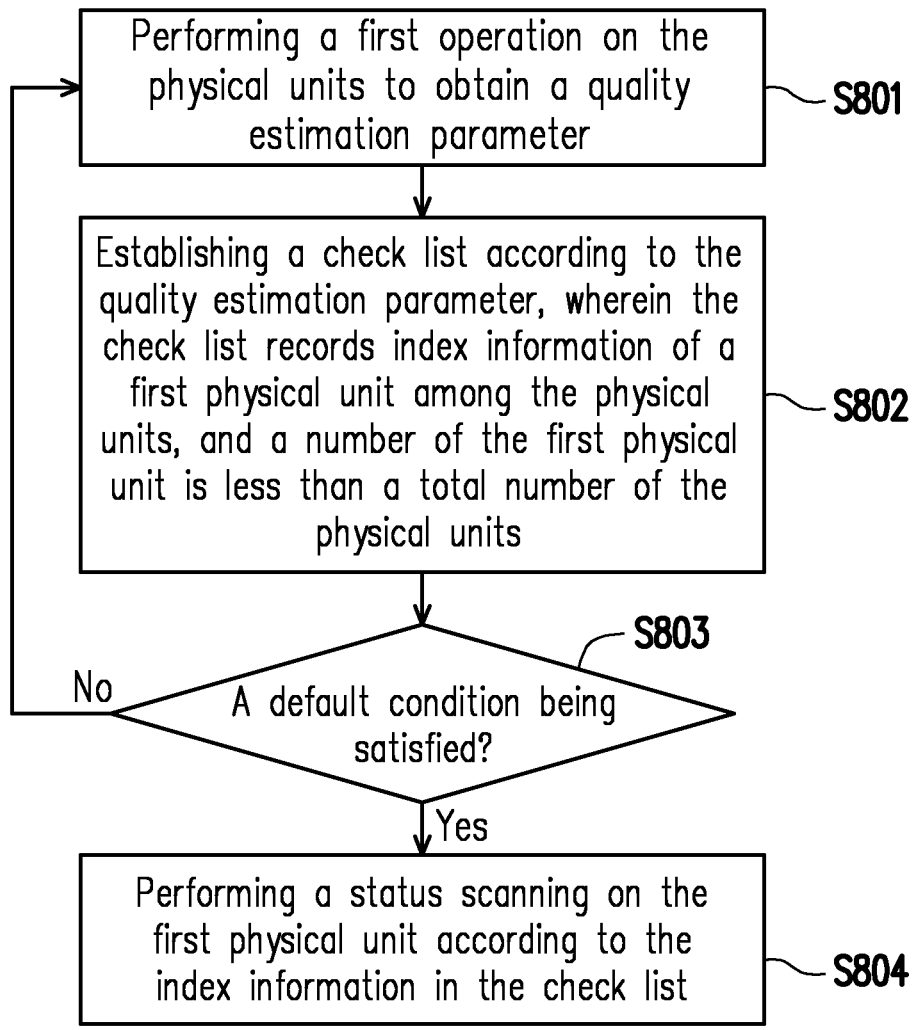
FIG. 8 is a flowchart of a memory management method according to an exemplary embodiment of the present disclosure.

FIG. 8 is a flowchart of a memory management method according to an exemplary embodiment of the present disclosure. Referring to FIG. 8, in step S801, a first operation is performed on multiple physical units to obtain quality estimation parameters corresponding to the multiple physical units. In step S802, a check list is established based on the quality estimation parameters, wherein the check list records index information of a first physical unit among the multiple physical units, and the number of the first physical unit is less than the total number of the multiple physical units. In step S803, it is determined whether the default condition is satisfied. If the default condition is satisfied, in step S804, in response to the default condition being satisfied, a status scanning is performed on the first physical unit according to the index information in the check list. However, if the default condition is not satisfied, the method may back to step S801.

However, each step in FIG. 8 has been described in detail above and will not be described again here. It is noted that each step in FIG. 8 may be implemented as multiple program codes or circuits, and the present disclosure is not limited thereto. In addition, the method in FIG. 8 may be used in conjunction with the above exemplary embodiments or may be used alone, and is not limited by the present disclosure.

To sum up, by performing, after the memory storage apparatus is just powered on or waked up, the status scanning on a part of physical units (i.e., the first physical unit) in the rewritable non-volatile memory module within a very short time range (i.e., the idle time range) which can be used freely, the memory management method, memory storage apparatus and memory control circuit unit provided by the present disclosure may quickly obtain the representative information for the overall data storage quality of the rewritable non-volatile memory module. Thereafter, the representative information may be used to adjust the read voltage level of some physical units (such as the physical units with relatively poor data storage quality), adjust the maintenance strategy for the rewritable non-volatile memory modules, and/or adjust the quality threshold configured to manage whether to record index information of specific physical unit into the check list. Therefore, the management and performance problems caused by the execution frequency of full-disc scanning being too high or too low in tradition may be effectively improved, thereby improving the maintenance efficiency of rewritable non-volatile memory modules.

The previously described exemplary embodiments of the present disclosure have the advantages aforementioned, wherein the advantages aforementioned not required in all versions of the disclosure.

It will be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory management method, which is adaptable for a rewritable non-volatile memory module, wherein the rewritable non-volatile memory module comprises a plurality of physical units, and the memory management method comprising:
performing a first operation, comprising at least one of a scan operation, a data read operation, and data decoding operation, on the physical units to obtain a quality estimation parameter corresponding to the physical units;
obtaining index information of a first physical unit among the physical units and establishing a check list according to the quality estimation parameter, wherein the check list records the index information of the first physical unit and a number of the first physical unit is less than a total number of the physical units; and
performing a status scanning on the first physical unit according to the index information in the check list, wherein a result of the status scanning reflects a current data storage quality of the first physical unit.

2. The memory management method according to claim 1, wherein the quality estimation parameter at least reflects at least one of a bit error rate and a wear degree of the first physical unit.

3. The memory management method according to claim 1, wherein the first physical unit comprises at least one physical unit with relatively poor data storage quality among the physical units.

4. The memory management method according to claim 1, further comprising:
recording, according to the quality estimation parameter, index information of at least one physical unit with data storage quality being lower than a quality threshold among the physical units into the check list.

5. The memory management method according to claim 1, wherein the step of establishing the check list according to the quality estimation parameter comprises:
sorting the physical units according to the quality estimation parameter;
selecting the first physical unit from the physical unit according to a sorting result of the physical units; and
recording the index information of the first physical unit into the check list.

6. The memory management method according to claim 1, further comprising:
in response to the quality estimation parameter being updated, updating the check list to add index information of a second physical unit among the physical units into the check list and remove index information of a third physical unit among the physical units from the check list.

7. The memory management method according to claim 1, further comprising:
in response to a memory storage apparatus comprising the rewritable non-volatile memory module being powered on or waked up, determining the default condition being satisfied.

8. The memory management method according to claim 1, further comprising:
performing a second operation according to the result of the status scanning, wherein the second operation comprises at least one of the following operations:
adjusting a read voltage level corresponding to the first physical unit;
adjusting a maintenance strategy for the physical units; and
adjusting a quality threshold, wherein the quality threshold is configured to manage whether to record index information of a specific physical unit among the physical units into the check list.

9. The memory management method according to claim 8, wherein the step of adjusting the maintenance strategy for the physical units comprises:
adjusting a frequency of performing a full-disc scanning on the physical units according to the result of the status scanning.

10. The memory management method according to claim 8, wherein the step of performing the second operation according to the result of the status scanning comprises:
obtaining a representative information, wherein the representative information reflects an overall data storage quality of the physical units; and
performing the second operation according to the representative information.

11. A memory storage apparatus, comprising:
a connection interface unit coupled to a host system;
a rewritable non-volatile memory module comprising a plurality of physical units; and
a memory control circuit unit coupled to the connection interface unit and the rewritable non-volatile memory module,
wherein the memory control circuit unit is configured to:
perform a first operation, comprising at least one of a scan operation, a data read operation, and data decoding operation, on the physical units to obtain a quality estimation parameter corresponding to the physical units;
obtain index information of a first physical unit among the physical units and establish a check list according to the quality estimation parameter, wherein the check list records the index information of the first physical unit, and a number of the first physical unit is less than a total number of the physical units; and
perform a status scanning on the first physical unit according to the index information in the check list, wherein a result of the status scanning reflects a current data storage quality of the first physical unit.

12. The memory storage apparatus according to claim 11, wherein the quality estimation parameter at least reflects at least one of a bit error rate and a wear degree of the first physical unit.

13. The memory storage apparatus according to claim 11, wherein the first physical unit comprises at least one physical unit with relatively poor data storage quality among the physical units.

14. The memory storage apparatus according to claim 11, wherein the memory control circuit unit is further configured to:

record, according to the quality estimation parameter, index information of at least one physical unit with data storage quality being lower than a quality threshold among the physical units into the check list.

15. The memory storage apparatus according to claim 11, wherein the operation of establishing the check list according to the quality estimation parameter by the memory control circuit unit comprises:
   sorting the physical units according to the quality estimation parameter;
   selecting the first physical unit from the physical unit according to a sorting result of the physical units; and
   recording the index information of the first physical unit into the check list.

16. The memory storage apparatus according to claim 11, wherein the memory control circuit unit is further configured to:
   in response to the quality estimation parameter being updated, update the check list to add index information of a second physical unit among the physical units into the check list and remove index information of a third physical unit among the physical units from the check list.

17. The memory storage apparatus according to claim 11, wherein the memory control circuit unit is further configured to:
   in response to the memory storage apparatus being powered on or waked up, determine the default condition being satisfied.

18. The memory storage apparatus according to claim 11, wherein the memory control circuit unit is further configured to:
   perform a second operation according to the result of the status scanning, wherein the second operation comprises at least one of the following operations:
   adjusting a read voltage level corresponding to the first physical unit;
   adjusting a maintenance strategy for the physical units; and
   adjusting a quality threshold, wherein the quality threshold is configured to manage whether to record index information of a specific physical unit among the physical units into the check list.

19. The memory storage apparatus according to claim 18, wherein the operation of adjusting the maintenance strategy for the physical units by the memory control circuit unit comprises:
   adjusting a frequency of performing a full-disc scanning on the physical units according to the result of the status scanning.

20. The memory storage apparatus according to claim 18, wherein the operation of performing the second operation according to the result of the status scanning by the memory control circuit unit comprises:
   obtaining a representative information, wherein the representative information reflects an overall data storage quality of the physical units; and
   performing the second operation according to the representative information.

21. A memory control circuit unit for controlling a rewritable non-volatile memory module, wherein the rewritable non-volatile memory module comprises a plurality of physical units, and the memory control circuit unit comprises:
   a host interface configured to be coupled to a host system;
   a memory interface configured to be coupled to the rewritable non-volatile memory module; and
   a memory management circuit coupled to the host interface and the memory interface,
   wherein the memory management circuit is configured to:
   perform a first operation, comprising at least one of a scan operation, a data read operation, and data decoding operation, on the physical units to obtain a quality estimation parameter corresponding to the physical units;
   obtain index information of a first physical unit among the physical units and establish a check list according to the quality estimation parameter, wherein the check list records the index information of the first physical unit, and a number of the first physical unit is less than a total number of the physical units; and
   perform a status scanning on the first physical unit according to the index information in the check list, wherein a result of the status scanning reflects a current data storage quality of the first physical unit.

22. The memory control circuit unit according to claim 21, wherein the quality estimation parameter at least reflects at least one of a bit error rate and a wear degree of the first physical unit.

23. The memory control circuit unit according to claim 21, wherein the first physical unit comprises at least one physical unit with relatively poor data storage quality among the physical units.

24. The memory control circuit unit according to claim 21, wherein the memory management circuit is further configured to:
   record, according to the quality estimation parameter, index information of at least one physical unit with data storage quality being lower than a quality threshold among the physical units into the check list.

25. The memory control circuit unit according to claim 21, wherein the operation of establishing the check list according to the quality estimation parameter by the memory management circuit comprises:
   sorting the physical units according to the quality estimation parameter;
   selecting the first physical unit from the physical unit according to a sorting result of the physical units; and
   recording the index information of the first physical unit into the check list.

26. The memory control circuit unit according to claim 21, wherein the memory management circuit is further configured to:
   in response to the quality estimation parameter being updated, update the check list to add index information of a second physical unit among the physical units into the check list and remove index information of a third physical unit among the physical units from the check list.

27. The memory control circuit unit according to claim 21, wherein the memory management circuit is further configured to:
   in response to a memory storage apparatus comprising the rewritable non-volatile memory module being powered on or waked up, determine the default condition being satisfied.

28. The memory control circuit unit according to claim 21, wherein the memory management circuit is further configured to:
   perform a second operation according to the result of the status scanning, wherein the second operation comprises at least one of the following operations:
   adjusting a read voltage level corresponding to the first physical unit;

adjusting a maintenance strategy for the physical units; and adjusting a quality threshold, wherein the quality threshold is configured to manage whether to record index information of a specific physical unit among the physical units into the check list.

29. The memory control circuit unit according to claim 28, wherein the operation of adjusting the maintenance strategy for the physical units by the memory management circuit comprises:

adjusting a frequency of performing a full-disc scanning on the physical units according to the result of the status scanning.

30. The memory control circuit unit according to claim 28, wherein the operation of performing the second operation according to the result of the status scanning by the memory management circuit comprises:

obtaining a representative information, wherein the representative information reflects an overall data storage quality of the physical units; and performing the second operation according to the representative information.

\* \* \* \* \*